US008838698B2

(12) United States Patent
Ally et al.

(10) Patent No.: US 8,838,698 B2
(45) Date of Patent: Sep. 16, 2014

(54) RECIPIENT ADDRESS MASKING IN COMPUTER COMMUNICATIONS

(75) Inventors: Afshan Ally, Markham (CA); Michael S. Roy-Diclemente, Richmond Hill (CA); Anthony L. Tjong, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1248 days.

(21) Appl. No.: 10/011,649

(22) Filed: Dec. 3, 2001

(65) Prior Publication Data

US 2003/0105823 A1 Jun. 5, 2003

(51) Int. Cl.
*G06F 15/16* (2006.01)
*H04L 12/58* (2006.01)
*H04N 1/32* (2006.01)
*G06Q 10/10* (2012.01)

(52) U.S. Cl.
CPC ............ *H04N 1/32416* (2013.01); *H04L 51/28* (2013.01); *H04L 51/36* (2013.01); *G06Q 10/10* (2013.01)
USPC ........................................................ 709/206

(58) Field of Classification Search
USPC .................. 709/200–206, 219–225, 229–332
See application file for complete search history.

(56) References Cited

U.S. PATENT DOCUMENTS

| | | | |
|---|---|---|---|
| 5,333,266 A | 7/1994 | Boaz et al. | |
| 5,406,557 A | 4/1995 | Baudoin | |
| 5,493,692 A * | 2/1996 | Theimer et al. | 455/26.1 |
| 5,781,614 A | 7/1998 | Brunson | |
| 5,812,795 A | 9/1998 | Horovitz et al. | |
| 5,825,869 A * | 10/1998 | Brooks et al. | 379/265.12 |
| 5,872,779 A | 2/1999 | Vaudreuil | |
| 5,937,161 A | 8/1999 | Mulligan et al. | |
| 5,944,786 A * | 8/1999 | Quinn | 709/206 |
| 5,987,508 A | 11/1999 | Agraharam et al. | |
| 6,122,258 A | 9/2000 | Brown | |
| 6,216,104 B1 * | 4/2001 | Moshfeghi et al. | 704/260 |
| 6,282,565 B1 * | 8/2001 | Shaw et al. | 709/206 |
| 6,411,685 B1 * | 6/2002 | O'Neal | 379/88.14 |
| 6,606,648 B1 * | 8/2003 | Mukundan et al. | 709/206 |
| 6,633,630 B1 * | 10/2003 | Owens et al. | 379/93.24 |
| 6,643,684 B1 * | 11/2003 | Malkin et al. | 709/206 |
| 6,697,458 B1 * | 2/2004 | Kunjibettu | 379/88.17 |
| 6,782,079 B2 * | 8/2004 | Skladman et al. | 379/88.13 |
| 6,839,717 B1 * | 1/2005 | Motoyama et al. | 707/104.1 |
| 7,231,427 B1 * | 6/2007 | Du | 709/206 |
| 7,581,221 B2 * | 8/2009 | Lai et al. | 718/101 |
| 7,606,864 B2 * | 10/2009 | Koch | 709/206 |
| 2002/0065034 A1 * | 5/2002 | Zhang | 455/2.01 |

(Continued)

*Primary Examiner* — Oleg Survillo
*Assistant Examiner* — Benjamin Ailes
(74) *Attorney, Agent, or Firm* — Cantor Colburn LLP

(57) ABSTRACT

A messaging system for masking addresses from sending processes. The messaging system maintains a message service profile and a service-address profile. The messaging system accesses recipient data. Sending processes are able to send messages to the messaging system in a form such that each message has an message type and list of recipients. The messaging system is able to determine which of a set of sending services is to be used to send the message, based on the message-service profile. The service-address profile stores information about where in the structure of recipient data the appropriate address for the selected service is located. The addresses corresponding to the named recipients, for the services determined by the messaging system, can be retrieved by from recipient data. The message system can then provide the recipient address to the appropriate sending services to send the message.

16 Claims, 1 Drawing Sheet

(56) References Cited

U.S. PATENT DOCUMENTS

| | | | |
|---|---|---|---|
| 2002/0138581 A1* | 9/2002 | MacIntosh et al. | 709/206 |
| 2003/0088556 A1* | 5/2003 | Allen, III | 707/3 |
| 2010/0121930 A1* | 5/2010 | Blight et al. | 709/206 |
| 2010/0306332 A1* | 12/2010 | Law | 709/206 |
| 2011/0064209 A1* | 3/2011 | Timmins et al. | 379/201.01 |

* cited by examiner

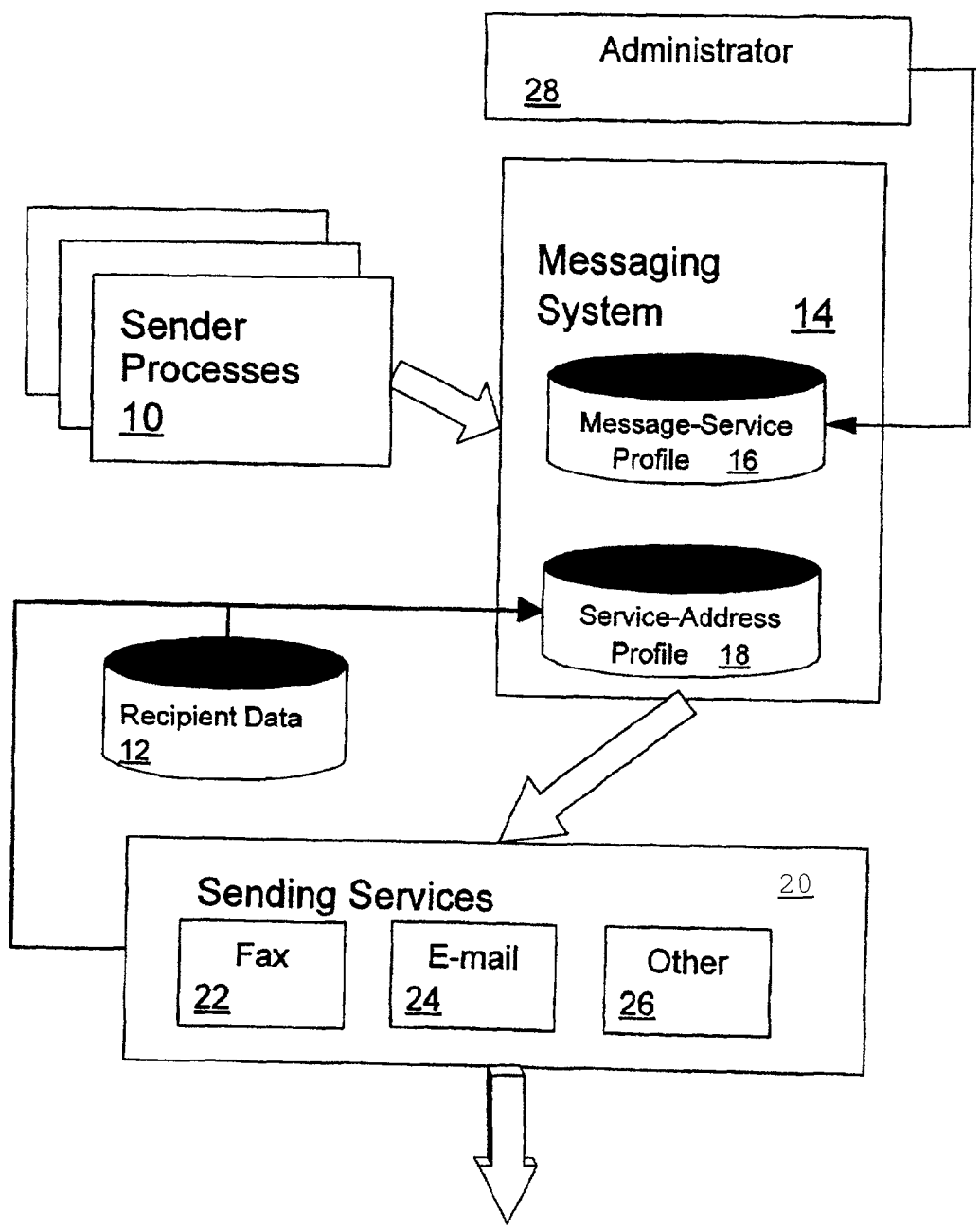

RECIPIENT ADDRESS MASKING IN COMPUTER COMMUNICATIONS

FIELD OF THE INVENTION

The present invention is directed to an improvement in computing systems and in particular to an improvement in sending messages to recipients using address masking.

BACKGROUND OF THE INVENTION

In computer systems, and particularly in e-commerce environments, it is typical that messages are sent to recipients using different potential sending services. For example messages may be sent by email, fax or other electronic gateways available to a sending system. Typically a system sending a message to a recipient has available to it the message to be sent, the recipient name, the sending service to be used and the address for the recipient to be utilized by the sending service. Thus where a sending system is forwarding a fax the recipients name and fax name will be used and a fax service called by the sending system to have the message sent to the recipient.

It is also known to interpose a messaging system between a sending system and the sending services. Such a messaging system will potentially automate the management of messages being sent using sending services.

With such systems, there is a potentially significant overhead for the sending system in maintaining information concerning the address of the recipient and the preferred method of receiving messages from the sending service. Similarly there is a potentially costly overhead involved in the sending system supporting new communication methods. For example where a secure electronic communications link is added to a system the sending system will require modification to support such a communication service.

It is therefore desirable to have a messaging system that is able to permit messages to be sent without the sender process specifying the service to be used for the message. It is also desirable to have a messaging system to permit new services to be added without requiring modifications to the sender process.

SUMMARY OF THE INVENTION

According to an aspect of the present invention there is provided an improved computer system for sending messages.

According to another aspect of the present invention there is provided a messaging system for use in association with a set of sending services, the messaging system including,
  means for accepting a message and an associated set of recipient identifiers from a sender process,
  a message-service profile including means for specifying one or more of the set of sending services corresponding to the accepted message and the associated set of recipient identifiers,
  means for retrieving from a set of recipient identifiers and recipient addresses, those recipient addresses corresponding to the set of recipient identifiers and corresponding to the specified sending services,
  means to pass the message to the specified sending services for delivery to the retrieved recipient addresses.

According to another aspect of the present invention there is provided the above messaging system further including a service-address profile for linking a given sending service to a corresponding subset of recipient addresses in the set of recipient identifiers and recipient addresses.

According to another aspect of the present invention there is provided the above messaging system in which the set of recipient identifiers and recipient addresses is maintained in a relational database table and in which the service-address profile defines in which field in the table recipient addresses corresponding to each of the set of sending services are located.

According to another aspect of the present invention there is provided the above messaging system in which the message has an associated message type and in which the message-service profile specifies the sending services based on the message type.

According to another aspect of the present invention there is provided the above messaging system in which the message type is provided to the messaging system by the sender process.

According to another aspect of the present invention there is provided the above messaging system further including means for an administrator to create and maintain the message-service profile.

According to another aspect of the present invention there is provided a computer program product for messaging, the computer program product including a computer usable medium having computer readable code means embodied in said medium, and including computer readable program code means for implementing a messaging system for use in association with a set of sending services, the messaging system including,
  means for accepting a message and an associated set of recipient identifiers from a sender process,
  a message-service profile including means for specifying one or more of the set of sending services corresponding to the accepted message and the associated set of recipient identifiers,
  means for retrieving from a set of recipient identifiers and recipient addresses, those recipient addresses corresponding to the set of recipient identifiers and corresponding to the specified sending services,
  means to pass the message to the specified sending services for delivery to the retrieved recipient addresses.

According to another aspect of the present invention there is provided a method for delivering a message from a sending process to defined recipients using one or more of a set of specified sending services, the method including the steps of
  a) obtaining the message, and a set of recipient identifiers corresponding to the defined recipients, from the sending process,
  b) specifying one or more of the set of sending services to be used to send the message,
  c) retrieving from a set of recipient data a recipient address for each recipient identifier, specified sending service pair,
  d) passing the message, recipient identifier and corresponding retrieved recipient address to each of the specified sending services for delivery.

According to another aspect of the present invention there is provided the above method in which the step of specifying one or more of the set of sending services includes a message-service profile look-up based on a defined message type, the message-service profile being defined to associate message types with sending services.

According to another aspect of the present invention there is provided the above method in which the step of retrieving recipient addresses includes a service-address profile look-up for each specified sending service, the service-address profile being defined to link each sending service to a subset of address data in the set of recipient data According to another aspect of the present invention there is provided a computer program product for delivering messages, the computer program product including a computer usable medium having computer readable code means embodied in said medium, and including computer readable program code means for carrying out the above methods.

According to another aspect of the present invention there is provided a messaging system for masking recipient addresses, the messaging system including
- means for accepting a message and associated recipient identifiers,
- means for determining sending services and recipient addresses for use in delivering the message and
- means for forwarding the message to the sending service for delivery to the recipient address.

It will be appreciated by those skilled in the art that the computer program of the invention can be stored on a storage medium or transmitted by wired or wireless transmission for use by computer systems or networks such as the Internet.

Advantages of the present invention include a messaging system that permits messages to be sent without the sender process specifying the service to be used for the message. A further advantage is that a messaging system is provided permitting new sending services to be added (for example new secure electronic communication gateways) without requiring modifications to the sender process.

BRIEF DESCRIPTION OF THE DRAWINGS

FIG. 1 is a block diagram showing components of the messaging system of the preferred embodiment.

DETAILED DESCRIPTION OF THE PREFERRED EMBODIMENT

FIG. 1 shows in a block diagram view components of the messaging system of the preferred embodiment. sender processes 10 are shown in FIG. 1 as being representative of different sending systems, or a single sending system that generate messages to be forwarded to recipients. Recipient data 12 is a collection of data that matches recipient name or identifier with recipient addresses. Messaging system 14 is shown containing message-service profile data 16 and service-address profile data 18. Also shown in FIG. 1 is a collection of sending services 20 comprising example fax service 22, email service 24 and a service denoted other service 26. Administrator 28 is also shown in FIG. 1.

In the preferred embodiment, sender processes 10 do not maintain information as to which sending service is to be used for forwarding a message, or the addresses to which messages are to be sent. Each one of sender processes 10 is able to generate messages to be sent to one or more recipients. In the preferred embodiment, a sender process will simply pass messaging system 14 the message and the names of the intended recipients. No address or method of delivering the message necessarily specified by sender processes 10. In the preferred embodiment, messaging system 14 arranges for the appropriate sending service to be used and the correct address for the recipients to be included with the message to be sent by one of sending services 20. The recipient address for the message is masked from sender processes 10.

Addresses for recipients are, however, maintained within the system of the preferred embodiment. FIG. 1 shows recipient data 12 as being a separate database. Recipient data may be created and maintained using different processes. For example, administrator 28 may directly maintain the data. Users may be given access to the data also to add or update information. In an e-commerce environment, applications run from a web server may manage the recipient data, based on browser input. Recipient data 12 is intended to include recipient names and addresses for the recipients for the appropriate different sending services.

It will be understood that a recipient name is typically the name of a person or organization but in certain circumstances can be an identifier that has meaning in the context of the system. For example, the preferred embodiment may be implemented for internal communications in a company where all messaging is sent based on employee number. In the description of the invention, name or identifier may be used to express data signifying a particular message recipient.

Messaging system 14 includes message-service profile 16. In the preferred embodiment, this data is created and maintained by administrator 28 using tools provided in messaging system 14. Message-service profile 16 maintains data to specify a sending service or services for a message. In the preferred embodiment, messages are defined to have types and message-service profile 16 associates sending services with those types. For example, a message may be defined to be an order type or an invoice type. The sending service used will potentially differ based on the type of the message.

It is also possible, however, for message-service profile 16 to be a sophisticated combination of preferences for the selection of sending services, based on recipient name and/or message or sending services characteristics. For example, urgent messages to particular recipients may be sent by both fax service 22 and email service 24 whereas confidential messages may be sent using other services 26.

Messaging system 14 also includes service-address profile 18. This profile specifies, for each sending service in sending services 20, where in recipient data 12 the appropriate address for the sending service wilt be found, In operation, after sender processes 10 sends a message with designated type and intended recipients to messaging system 14, message-service profile 16 is accessed. Messaging system 14 in this way determines which sending services 20 are to be utilized for forwarding the message to the recipients. In the preferred embodiment, the sending service selected is based on a the message type for the message to be sent. Message service profile 16 is accessed to look up which sending service (or services) is specified for the message type in question.

Service address profile 18 is then accessed to determine where in recipient data 12 the appropriate address is located for the sending service to be used. For example, where recipient data 12 is a database of records having fields, service-address profile 18 will indicate which field contains addresses used by a given one of sending services 20. Service-address profile 18 maintains a link between the sending service and the location of an address within the structure of recipient data 12.

Once the appropriate link to recipient data 12 has been obtained from service-address profile 18, messaging system 14 accesses recipient data 12 to obtain the address (or addresses) for the recipient (or recipients) corresponding to the sending services to be used. The message is then sent from messaging system 14 to the appropriate sending service in sending services 20, with the address retrieved. Where there are multiple recipients or multiple services to be used, messaging system 14 ensures that the services are accessed to provide for communication of all messages to all recipients in the appropriate manner.

The maintenance of the system of the preferred embodiment benefits from the architecture described above. A new sending service may be added to sending services 20 without requiring changes to sender processes 10. Where a new sending service is added to sending services 20, administrator 28 will update message service profile 16, as appropriate. Service address profile 18 will be changed to add a new link to recipient data 12, indicating the location of the appropriate address in the structure of recipient data 12. The sender process functionality remains as previously defined, messages are forwarded to messaging system 14 with the type and the indicated recipients. The inclusion of the new sending service, and the addresses required for the new service, are masked from sender processes 10.

Although a preferred embodiment of the present invention has been described here in detail, it will be appreciated by those skilled in the art that variations may be made thereto without departing from the spirit of the invention or the scope of the appended claims.

The embodiments of the invention in which an exclusive property or privilege are claimed are defined as follows:

1. A method for delivering a message from a sending process to defined recipients using one or more of a set of specified sending services, the method comprising the steps of:
   a) obtaining the message, and a set of recipient identifiers corresponding to the defined recipient, from the sending process, recipient addresses for the message masked from said sender process;
   b) specifying one or more of a set of sending services to be used to send the message in a message service profile, the message service profile defining particular methods of delivery corresponding to obtained messages and associated recipient identifiers, wherein the particular methods of delivery include at least one of a fax service and an e-mail service;
   c) determining based on the information provided about each sending service as which sending services is most appropriate for a recipient;
   d) retrieving from a set of recipient data, a recipient address for each recipient identifier, specified sending service pair, the message service profile being inaccessible to the sending process;
   e) passing the message, recipient identifier and corresponding retrieved recipient address to each of the specified sending services for delivery; and
   f) adding one or more new sending services to the set of sending services, the new sending services providing additional methods of delivery for the sending process without reconfiguring the sender process.

2. The method of claim 1 in which the step of specifying comprises performing a message-service profile look-up based on a defined message type, the message-service profile being defined to associate message types with sending services.

3. The method of claim 1 in which the step of retrieving from a set of recipient data a recipient address comprises performing a service-address profile look-up for each specified sending service, the service-address profile being defined to link each sending service to a subset of address data in the set of recipient data.

4. A system for use in association with a set of sending services, the sending services including a plurality of methods of delivery, wherein the plurality of methods of delivery includes at least one of a fax service and an e-mail service, the system comprising:
   a memory;
   a processor coupled to said memory configured to execute:
   a sender process generating a message and associated set of recipient identifiers, recipient addresses and method of delivery for the message masked from said sender process;
   a messaging system accepting the message and associated set of recipient identifiers from the sender process through a communication path and delivering the message to a recipient;
   the messaging system including a message-service profile;
   the message service profile having a list of available sending services and associated information and preferences about each sending service so that the messaging system can determine which sending service is appropriate to be used for the recipient;
   the preferences including message urgency and methods of delivery corresponding to the accepted message and the associated set of recipient identifiers;
   the messaging system including a computer retrieving from a set of recipient identifiers and recipient addresses, those recipient addresses corresponding to the set of recipient identifiers and corresponding to the specified sending services; and
   wherein the messaging system passes the message to the specified sending services for delivery to the retrieved recipient addresses, wherein the message service profile in the messaging system is not accessible to the sender process, and one or more new sending services are added to the set of sending services, the new sending services providing additional methods of delivery for the sending process without reconfiguring the sender process.

5. The system of claim 4, wherein the messaging system further comprises a service-address profile for linking a given sending service to a corresponding subset of recipient addresses in the set of recipient identifiers and recipient addresses.

6. The system of claim 5 in which the set of recipient identifiers and recipient addresses is maintained in a relational data base table and in which the service-address profile defines in which field in the table recipient addresses corresponding to each of the set of sending services are located.

7. The system of claim 4 in which the message has an associated message type and in which the message-service profile specifies the sending services based on the message type.

8. The system of claim 7 further comprising an administrator to create and maintain the message-service profile, the administrator enabling a recipient, but not the sender process, to create new sending services.

9. The messaging system of claim 8 wherein the administrator is accessible to the recipient but not to the sender process, the administrator being controllable by the recipient to modify the message service profile.

10. The system of claim 4, wherein the messaging system further includes a computer retrieving a plurality recipient addresses from a single recipient identifier.

11. The system of claim 4, wherein the messaging system includes a service address profile for determining the recipient address.

12. A computer program product for messaging, the computer program product comprising a tangible and non-transitory computer readable storage medium having computer readable code embodied in said medium, and comprising computer readable program code for implementing a system for use in association with a set of sending services, the system comprising;

a sender process for generating a message and associated set of recipient identifiers, recipient addresses for the message masked from said sender process, and said message not including a method of delivery;

a messaging system for accepting the message and associated set of recipient identifiers from the sender process through a communication path and delivering the message to a recipient;

the messaging system including a message-service profile comprising a computer means for specifying one or more of the set of sending services defining particular methods of delivery corresponding to the accepted message and the associated set of recipient identifiers, wherein the methods of delivery include at least one of a fax service and an e-mail service;

the message-service profile having a list of available sending services and associated information about each sending service so that the messaging system can determine which sending service is appropriate to be used for the recipient;

the information including message urgency;

the messaging system including a computer means for retrieving from a set of recipient identifiers and recipient addresses, those recipient addresses corresponding to the set of recipient identifiers and corresponding to the specified sending services; and wherein the messaging system passes the message to the specified sending services for delivery to the retrieved recipient addresses, wherein the message service profile in the messaging system is not accessible to the sender process, and one or more new sending services are added to the set of sending services, the new sending services providing additional methods of delivery for the sending process without reconfiguring the sender process; and a computer means for enabling a recipient to modify the message-service profile without modifying the sender process.

13. The program product of claim 12 wherein said storage medium is a tangible recordable data storage medium.

14. A computer program product comprising a tangible and non-transitory computer readable storage medium having computer readable code embodied in said medium, the computer readable program code carrying out a method for delivering a message from a sending process to defined recipients using one or more of a set of specified sending services, the method comprising the steps of:

obtaining the message, and a set of recipient identifiers corresponding to the defined recipient, from the sending process, recipient addresses for the message masked from said sender process;

specifying one or more of a set of sending services to be used to send the message in a message service profile, the message service profile defining particular methods of delivery corresponding to obtained messages and associated recipient identifiers, wherein the particular methods of delivery include at least one of a fax service and an e-mail service;

determining based on the information provided about each sending service as which sending services is most appropriate for a recipient;

retrieving from a set of recipient data, a recipient address for each recipient identifier, specified sending service pair, the message service profile being inaccessible to the sending process;

passing the message, recipient identifier and corresponding retrieved recipient address to each of the specified sending services for delivery; and adding one or more new sending services to the set of sending services, the new sending services providing additional methods of delivery for the sending process without reconfiguring the sender process.

15. A system for use in association with a set of sending services, the system comprising:

a memory;

a processor coupled to said memory configured to execute:

a sender process generating a message and associated set of recipient identifiers, recipient addresses for the message masked from said sender process;

a messaging system accepting a message having an associated message type and an associated set of recipient identifiers from the sender process and delivering the message to a recipient;

the messaging system including a message-service profile specifying one or more of the set of sending services defining particular methods of delivery based on the accepted message and the associated set of recipient identifiers, wherein the particular methods of delivery include at least one of a fax service and an e-mail service;

the messaging system including a service-address profile for linking a given sending service to a corresponding subset of recipient addresses in the set of recipient identifiers and recipient addresses;

the messaging system including a computer retrieving, from a set of recipient identifiers and recipient addresses, those recipient addresses corresponding to the set of recipient identifiers and corresponding to the specified sending services, the set of recipient identifiers and recipient addresses being maintained in a relational database table and the service-address profile defining in which field in the table recipient addresses corresponding to each of the set of sending services are located;

wherein the messaging system passes the message to the message-service determining an appropriate sending service to be used for a recipient based on information about sending services available specified by sending services for delivery to the retrieved recipient addresses, wherein the message-service profile and the service-address profile are not accessible to the sender process, and one or more new sending services are added to the set of sending services, the new sending services providing additional methods of delivery for the sending process without reconfiguring the sender process; and a computer enabling a recipient to modify the message service profile.

16. A system for masking recipient addresses from a sender, the system comprising:

a memory;

a processor coupled to said memory configured to execute:

a messaging system accepting a message and associated recipient identifiers from the sender and delivering the message to a recipient, the message not containing information relating to the method for delivering the message, wherein the method or delivering the message includes at least one of a fax service and an e-mail service;

the messaging system including a recipient profile containing sending services and recipient addresses for use in delivering the message;

wherein the recipient profile and type of message is used by the messaging system to determine a message system delivery system;

a computer forwarding the message to the sending service for delivery to the recipient address; and a computer masking the recipient profile and addresses so that they are inaccessible to the sender;

wherein one or more new sending services are added, the new sending services providing additional methods of delivery for the computer means for forwarding the message without reconfiguring the computer means for forwarding the message.

\* \* \* \* \*